United States Patent [19]
Nanba et al.

[11] 3,970,842
[45] July 20, 1976

[54] AUTOMATIC FOCUS CONTROL DEVICE

[75] Inventors: Yasuhiro Nanba, Osaka; Toshinori Imura, Sakai; Mitsuru Saito, Kaizuka, all of Japan

[73] Assignee: Minolta Camera Kabushiki Kaisha, Osaka, Japan

[22] Filed: July 8, 1975

[21] Appl. No.: 594,076

[30] Foreign Application Priority Data
July 30, 1974 Japan............................ 49-87796

[52] U.S. Cl................................ 250/201; 354/25; 356/4
[51] Int. Cl.$^2$ ........................................ G01J 1/20
[58] Field of Search .......... 250/201, 204, 208, 209, 250/237; 354/25, 162; 356/4, 125, 126

[56] References Cited
UNITED STATES PATENTS

| | | | |
|---|---|---|---|
| 3,781,110 | 12/1973 | Leitz et al. | 356/4 |
| 3,849,643 | 11/1974 | Takeda | 250/201 |
| 3,896,304 | 7/1975 | Aoki et al. | 354/25 |

*Primary Examiner*—Alfred E. Smith
*Assistant Examiner*—D. C. Nelms
*Attorney, Agent, or Firm*—Wenderoth, Lind and Ponack

[57] ABSTRACT

An automatic focus control device has an optical system including an image scanner. The image scanner is disposed between a range-finding lens and at least one light receptor element and on the path of travel of the incoming light towards the light receptor element through the range-finding lens. A mechanism is also disclosed for simultaneously measuring the object-to-lens distance and detecting the contrast of an image of the object projected on the scanner merely by moving the scanner in a direction diverging from the optical axis while a parallel relation between the plane of the scanner and the plane perpendicular to the optical axis is retained.

13 Claims, 22 Drawing Figures

AUTOMATIC FOCUS CONTROL DEVICE

The present invention relates to an automatic focus control device for automatically focusing the image of an object on a particular image plane, which is useable in any of optical instruments such as photographic cameras capable of producing still pictures, motion pictures or television pictures, picture projectors for slide film or motion picture film, or photographic enlarger. object More particularly, the present invention relates to an improvement in the automatic focus control device wherein the intended focus control to focus the optical image on the image plane is carried out by relying on the contrast of the image, or the amplitude of spatial frequency included in the image, of an ojbect to be, for example, photographed, which image if formed by an objective lens assembly of the optical instrument and in turn projected towards the particular image plane.

In a known automatic focus control system wherein a method of automatic focusing relies on the contrast of the image, or the amplitude of spatial frequency included in the image, of an object to be, for example, photographed, a beam spliting element is provided on the optical axis of the objective lens assembly at right angles thereto for dividing the incoming, image carrier beam of light into first and second beam portions; the first beam portion being directed towards a first light receptor element and representing the intensity of light reflected from one portion of the object to be photographed while the second beam portion is directed towards a second light receptor element and represents the intensity of light reflected from the other portion of the same object which is in the close vicinity of said one portion of said object. This known focus control system is considered as utilizing the phenomenon wherein a difference between the level of output from the first light receptor element and that from the second light receptor element as a result of comparison with each other attains a maximum value when the image is exactly focused on the image plane where, for example, a light sensitive film is placed.

More specifically, the beam spliting element used in the known focus control system is in the form of a semi-transparent or transparent framework having one surface grated to provide a series of parallel prism bars, each of said prism bars having prism faces which are inclined to provide a roof-shaped configuration in section projecting from the body of the semi-transparent or transparent framework. This form of beam spliting element is designed such that the incoming light, which carries the optical image of the object formed by the objective lens assembly, can, as it impinges upon the framework, be divided into the first and second beam portions which, after having passed through the body of the framework, emerge from the opposite surface of the framework and travel in different directions from each other towards the associated first and second light receptor elements at an angle of divergence defined by the inclination of the prism faces. In other words, the direction of travel of the divided beam portions after having emerged from the opposite surface of the framework is determined by the angle of incidence of the incoming light impinging upon the grated surface of the framework. According, it will readily be seen that, if the angle of incidence of the incoming light impinging upon the grated surface of the framework is adjusted by suitably selecting the aperture of the objective lens assembly and the relative distance between the objective lens assembly and the beam splitting element, the pattern of distribution of the first beam portion, which is a component of the incoming light having impinged upon one of the prism faces, and that of the second beam portion, which is a component of the incoming light having impinged upon the other of the prism faces, can respectively be limited and, in addition, the first and second beam portions can substantially completely be separated from each other.

The first and second light receptor elements are respectively so disposed on the path of travel of the first and second beam portions emerging from the beam spliting element that the contrast of the image, or the amplitude of spatial frequency included in the image, of the object which are respectively regulated by the size of the associated prism faces, can ultimately be examined.

This will now be described with particular reference to FIGS. 4 to 10.

Assuming that an optical image of a stripped pattern, composed of dark and bright bands X' and Y', each two adjacent dark or bright bands X' or Y' being spaced a distance equal to the pitch between the adjacent two prism bars 3, is exactly focused on the grated surface of the framework and that the stripped pattern is synchronized in phase with the framework in such a manner that, as shown in FIG. 4a, the prism faces X and Y of each of the prism bars 3 on the framework are respectively aligned with the dark and bright bands X' and Y', one of the first and second light receptor elements, for example, the first light receptor element, which is disposed on the path of travel of the first beam portion, can be illuminated while the other of the first and second light receptor element, that is, the second light receptor element, which is disposed on the path of travel of the second beam portion, cannot be illuminated. Accordingly, it will readily be seen that, as shown in FIG. 4b, the first light receptor element, designated by A in the graph of FIG. 4b, gives an output while the second light receptor element, designated by B in the same graph, gives no output, the difference between the respective levels of the outputs from the first and second light receptor elements being of a relatively great value and substantially in proportion to the contrast of the dark and bright bands X' and Y'.

In the case where the image, projected onto the grated surface of the framework, is out of focus such that, as shown in FIG. 5a, the contrast of the dark and bright bands X' and Y' is blurred, the intensity of light received by the first light receptor element A is reduced while the intensity of light received by the second light receptor element B is increased as substantially shown in the graph of FIG. 5b.

However, as shown in FIG. 6a, when the stripped pattern is displaced in phase from the prism bars 3 while the image of the stripped pattern is exactly focused on the grated surface of the framework, the difference in the level of output between the first and second light receptor elements A and B becomes small, as substantially shown in the graph of FIG. 6b, by the reason which has already been described. Similarly, even when the stripped pattern is displaced in phase from the prism bars 3 while the image of the stripped pattern is out of focus as shown in FIG. 7a, the difference in the level of output between the first and second light receptor elements A and B becomes small as substantially shown in the graph of FIG. 7b. From the comparison of the graphs of FIGS. 6b and 7b, it will readily be seen that the difference in the level of output shown in FIG. 6b does not substantially depart from the difference in the level of output shown in FIG. 7b.

From the foregoing, it can be concluded that, even though the stripped pattern remains the same, the accuracy of detection varies depending upon the position of the stripped pattern relative to the position of the beam spliting element. Therefore, where the beam spliting element of the construction referred to above is practically utilized in the focus control system, it is required for the beam spliting element to be repeatedly moved a distance equal to one or more pitches in a direction at right angles to the optical axis of the objective lens assembly.

This repeated movement, that is, linear oscillation, of the beam spliting element referred to above is necessary not only to avoid the variation in detection accuracy, but also to facilitate subsequent processing of an electrical output signal detected.

However, in the case where focus control procedures are carried out without the beam spliting element being linearly oscillated, it may happen that variation of the output signals from the light receptor elements, which are respectively generated when the image is exactly focused and when the image is out of focus, exhibits a substantially D.C. characteristic and, therefore, tends to be adversely affected by the temperature drift and other factors to an extent that the accuracy of detection will be lowered.

On the contrary thereto, in the case where the focus control procedures are carried out with the beam spliting element being linearly oscillated, variation of the output signal, which occurs as the objective lens assembly is adjusted in pursuit of a true focus, exhibits an A.C. characteristic as shown in FIG. 8 and, therefore, detection of the time at which the image has been focused can easily be done.

Although the foregoing description has been made on the assumption that the recurring cycle of the dark and bright bands of the stripped pattern is equal to the pitch between each two adjacent prism bars forming parts of the beam spliting element, a description similar to that can equally be applicable to other objects having a contrast, that is, a distribution of substantially dark and bright areas. For example, as the frequency of an object having such a contrast displaces from the pitch between each two adjacent prism bars of the beam spliting element, as shown in FIGS. 9 and 10, the difference in the leve of output between the light receptor elements A and B becomes so small irrespective of whether the image of the object is focused or whether the image of the same object is out of focus that the detection accuracy can be lowered considerably.

In view of the foregoing, such a method of detection of whether or not a particular image is focused on a particular image plane may be considered the method of effecting focus control by the detection of a component of the spatial frequencies which corresponds to the pitch between each two adjacent prism bars of the beam spliting element. This method can also be equally applicable to most actual objects. In other words, since most actual objects can be consideraed as composed of various spatial frequency components, some of which correspond to the pitch between each two adjacent prism bars of the beam spliting element, true focusing in such a way to bring the image of the object to the particular image plane can be done relying on the magnitude of that spatial frequency components.

As hereinbefore described, in order to carry out the focus control in such a way as to measuring the contrast, or comparing the contrasts, of the mutually adjoining portions of the image, the beam spliting element should be oscillated in a direction at right angles to the optical axis of the objective lens assembly while the relative distance between the objective lens assembly and the beam spliting element is concurrently adjusted. In order to enable the adjustment of the relative distance between the objective lens assembly and the beam spliting element, two methods can be considered: One is to move the objective lens assembly in a direction parallel to the optical axis while the beam spliting element is fixed and the other is to move the beam spliting element while the objective lens assembly is fixed. However, since the objective lens is usually bulky in relation to the beam spliting element, the first mentioned method is undesirable. On the contrary, in the second mentioned method, since the beam spliting element has to be moved in the direction at right angles to the optical axis as hereinbefore described, complicated mechanisms are required and, therefore, the second mentioned method is also undesirable.

Accordingly, an essential object of the present invention is to provide an improvement in the automatic focus control device which overcomes the foregoing disadvantages and inconveniences referred to above.

In summary, an essential feature of the present invention resides in that focus detection is carried out by moving a scanning means, which acts as a spatial frequency filter, in a direction diagonal to the optical axis.

In order to detect the position of a true focus, the following two basic procedures are required. One procedure is to detect the contrast of the real image or the amplitude of the spatial frequency of the real image. For this purpose, one or more detecting elements, for example, photoconductive elements such as CdS cells, have heretofore been employed. However, the use of such detecting elements involves a problem in terms of responsivity and is, therefore, ineffective.

As another method, a combination of a light receptor element, placed on a particular image plane where the image is to be focused, with a pin-holed element placed in front of the light receptor surface has also been used. In this case, the pin-holed element has at least one pin hole which, during operation of the pin-holed element, is repeatedly brought into alignment with the optical axis so as to scan the image and, on the other hand, the light receptor element, after having sensed a substantially pulsating input of light coming through the pin hole of the pin-holed element, gives an electrical output signal, a high frequency component of which output signal is utilized as a contrast signal. This method has an advantage that the size of the pin-hole is practically limited.

A further method which has also been practiced is to use a spatial frequency filter which is placed on the image plane where the image is to be focused. This spatial frequency is adapted to be moved in a direction perpendicular to the optical axis of an optical system so that a pulse signal indicative of the contrast of the image can be detected. In this method, in order to detect whether or not the position of the focus is on the image plane, the distance between the position of the focus of the optical system and the image plane is varied to find the position where the pulse signal indicative of the contrast of the image, which has been detected in the manner as hereinbefore described, attains a maximum value. According to this method, the optical system is moved in a direction parallel to the optical axis thereof so as to bring the focus to the image plane.

On the contrary thereto, according to the present invention, these two procedures are simultaneously carried out only by moving the spatial frequency filter in one direction, taking advantage of the particular characteristic of the spatial frequency filter. More specifically, in the practice of the present invention, the spatial frequency filter is reciprocally moved in a direction diagonal to the optical axis, the diagonal direction of movement of said filter being represented by a composite of a directional component of movement in a direction parallel to the optical axis and a directional component of movement in a direction at right angles to the optical axis, the principle of which will now be described with particular reference to FIGS. 1 to 3.

Referring to FIGS. 1 to 3, if a beam of light, composed of dark and bright components as substantially shown in FIG. 2, impinges upon a spatial frequency filter F, the bright component of the light beam can pass through slits h of the spatial frequency filter F. On the contrary thereto, if the filter F is, while the same beam of light impinges on the spatial frequency filter F, displaced either to the left or to the right, as viewed in FIG. 3, a distance substantially equal to half the pitch between each two adjacent slits h, the bright component of the light beam is blocked off by wall portions W of the spatial frequency filter F. If the beam of light which has passed through the slits h of the spatial frequency filter F is sensed by a photoelectric element P as shown in FIG. 1 and is subsequently converted into an electric signal and, at the same time, the filter F is moved at a constant speed in a direction parallel to the plane of the spatial frequency filter F, one cycle of A.C. signal each time the filter F is moved a distance equal to one pitch between the adjacent two slits h of the spatial frequency filter F. The peak-to-peak value of the A.C. signal thus obtained increases with sharpness of the contrast of the image carried by the incoming light.

When the image projected through the objective lens assembly is out of focus, the high component of the spatial frequencies which make up the image is small and, on the other hand, when the image is exactly focused, the high component of the spatial frequencies is great. Accordingly, if the pitch between each two adjacent slits of the spatial frequency filter is selected so as to correspond to the frequency of the high component of the spatial frequencies, the peak-to-peak value of the output signal can be maximized at the time the image is exactly focused. Therefore, if the spatial frequency filter is moved in the direction diagonal to the optical axis, the maximum of the peak-to-peak value of the output A.C. signal can easily be found.

In the practice of the present invention, for the spatial frequency filter, any element can be used provided that it can act as a spatial frequency filter. By way of example, a photodiode having a light receiving area fomred in the shape of a grid may be employed, in which case a condensing lens is not necessary.

As hereinbefore described, since the present invention is featured in that the above two procedures are simultaneously performed by moving the spatial frequency filter in the diagonal direction, mechanisms and parts necessary to effectuate an image scanning can be simplified.

These and other objects and features of the present invention will become apparent from the following description taken in conjunction with preferred embodiments thereof with reference to the accompanying drawings, in which:

FIG. 4a is a schematic diagram showing the grated surface of a beam spliting element in relation to a stripped pattern when the image of the stripped pattern is focused on the grated surface of the beam spliting element;

FIG. 4b is a schematic graph illustrating the difference in output between two light receptor elements available during the condition of FIG. 4a;

FIG. 5a is a similar diagram to FIG. 4a, showing the grated surface of the beam spliting element in relation to the stripped pattern when the image of the stripped pattern is out of focus;

FIG. 5b is a schematic graph illustrating the difference in output between the light receptor elements available during the condition of FIG. 5a;

FIG. 6a is a schematic diagram showing the grated surface of the beam spliting element in relation to the stripped pattern when the image of the stripped pattern is focused on the grated surface while the grated surface and the stripped pattern are displaced in phase from each other;

FIG. 6b is a schematic graph illustrating the difference in output between the two light receptor elements available during the condition of FIG. 6a;

FIG. 7a is a schematic diagram showing the grated surface of the beam spliting element in relation to the stripped pattern when the image of the stripped pattern is out of focus while the grated surface and the stripped pattern are displaced in phase from each other;

FIG. 7b is a schematic graph illustrating the difference in output between the two light receptor elements available during the condition of FIG. 7a;

FIG. 13a illustrates a photodiode array useable in the present invention in place of the beam spliting element;

FIG. 13b is an electric equivalent circuit of the photodiode array of FIG. 13a;

Before the description of the present invention proceeds, it should be noted that like parts are designated by like reference numerals throughout the accompanying drawings.

Figure 1:
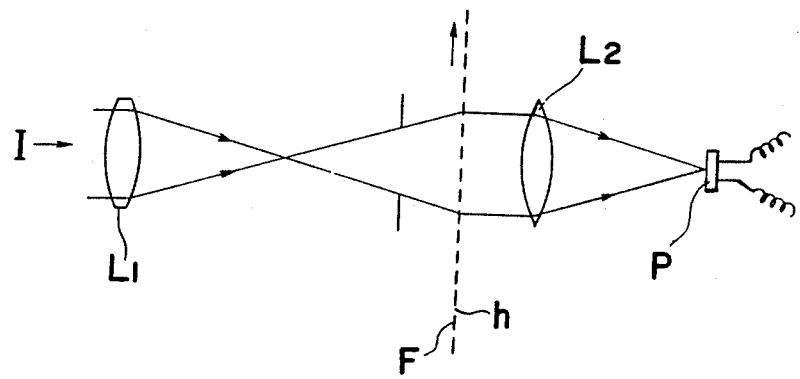
FIG. 1 is a schematic diagram showing an optical system of an example of focus control device, which is used to explain the principle concept of the present invention.
Figure 2:
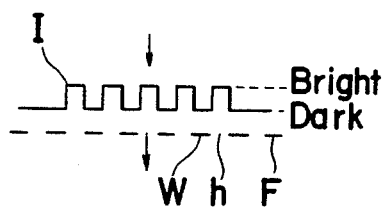
FIG. 2 is a schematic diagram showing a spatial frequency filter, used in the system of FIG. 1, in relation to the incoming light, said spatial frequency filter being shown in one operative position.
Figure 3:
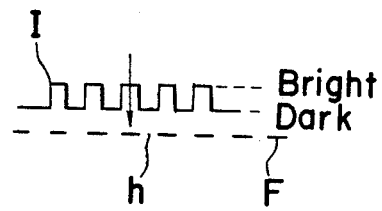
FIG. 3 is a similar diagram to FIG. 2, showing the spatial filter in another operative position.
Figure 4:
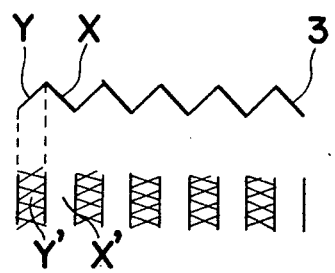
Figure 5:
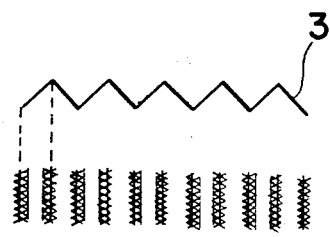
Figure 4:
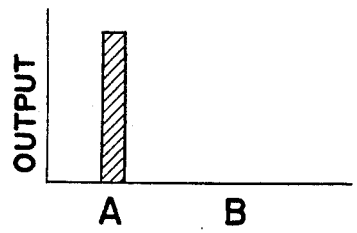
Figure 5:
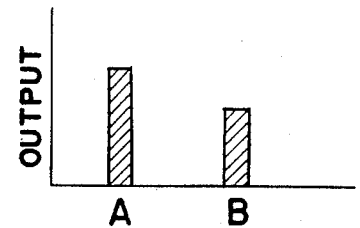
Figure 6:
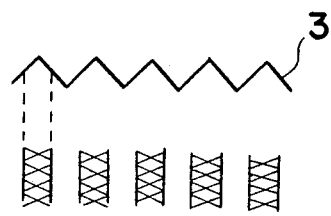
Figure 7:
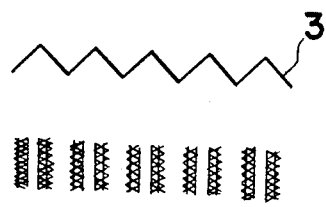
Figure 6:
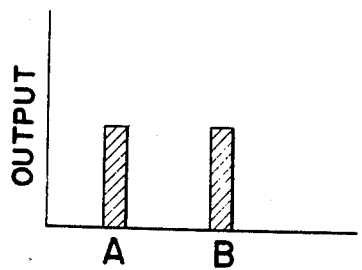
Figure 7:
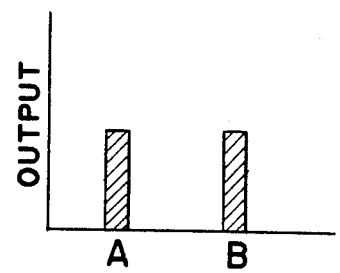
Figure 8:
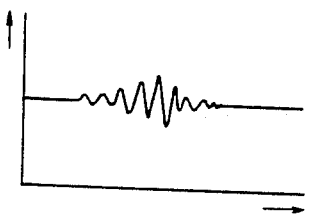
FIG. 8 illustrates the waveform of an output signal.
Figure 9:
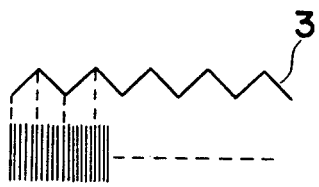
FIG. 9 and FIG. 10 illustrate the grated surface of the beam spliting element in relation to different images of objects.
Figure 10:
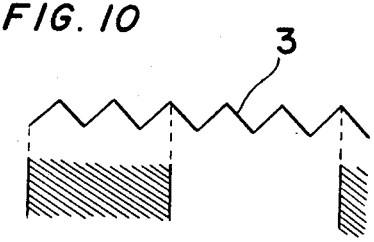
Figure 11:
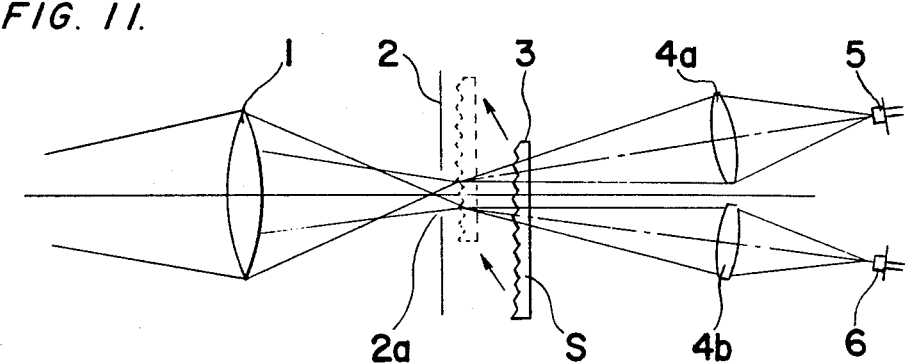
FIG. 11 is a schematic diagram showing an optical system of the focus control device according to the present invention.

Referring first to FIG. 11, reference numeral 1 represents a condensing or focusing lens. Positioned behind is a mask 2 having an aperture 2a for restricting the angle of sight, said mask 2 being positioned in such a manner that the aperture 2a is aligned with the optical axis of said lens 1.

Image scanning means which acts as a spatial frequency filter is, in the example of FIG. 11, shown as employed in the form of a transparent beam spliting element S which comprises a body or framework having one surface grated to provide, or otherwise cemented with, a series of parallel prism bars 3, each of said prism bars 3 having prism faces 3c and 3d which are inclined to provide a roof-shaped configuration in section projecting from the body or framework. This beam spliting element S is supported behind the mask 2 substantially in alignment with the optical axis and the aperture 2a in such a manner as will be described in more details in the subsequent description with the grated surface thereof facing the aperture 2a. The beam spliting element S is reciprocally movable close to and away from the mask 2 in a direction diverging from and diagonal to the optical axis of the lens 1, as indicated by the arrowheaded lines, with the plane of said framework intersecting at right angles to the optical axis. More specifically, the beam spliting element S moves between a forward position, as indicated by the imaginary line, and a rearward position as indicated by the real line.

It will readily be seen that, as the incoming light impinges upon the grated surface of the beam spliting element S through the aperture 2a in the mask 2, the incoming light passes through the framework after having been deflected in part in one direction and in part in another direction, both of said directions being determined by the prism faces 3c and 3d of each of the prism bars 3. More specifically, the beam spliting element S in the example of FIG. 11 is designed such that the incoming light can be divided into two components; one component carrying a portion of an image of a target object while the other component carries another portion of the same image of the target object which is in the close vicinity of said portion of said image spaced a distance corresponding to the pitch between each two adjacent prism bars 3, these components traveling in different directions diverging from the optical axis after having emerged from the beam spliting element S.

It is to be noted that the movement of the beam spliting element S in the direction diagonal to the optical axis may be said to be composed of a component of movement in a direction parallel to the optical axis and a component of movement in a direction at right angles to the optical axis. On the other hand, movement of the beam spliting element S in the direction at right angles to the optical axis is necessitated to scan the image while movement of the same beam spliting element S in the direction parallel to the optical axis is also necessitated to detect the distance between the target object and the lens 1, the distance of movement of said beam spliting element S in the direction parallel to the optical axis being determined depending upon the distance to be measured.

Positioned between the beam spliting element S and first and second light receptor elements 5 and 6 are condensing lenses 4a and 4b which are respectively disposed on the path of travel of the divided components of the incoming light which has impinged upon the grated surface of the beam spliting element. These condensing lenses 4a and 4b act to condense the respective components of the incoming light towards the light receptor elements 5 and 6 and, hence, the image of the target object, which has been projected onto the beam spliting element S through the lens 1, is in turn projected onto the respective light receptor elements 5 and 6.

The light receptor elements 5 and 6 act to convert rays of light, received thereby, into respective electrical signals proportional to the intensities of the divided beam components, which electrical signals are in turn applied to a comparison circuit (not shown) so that levels of these signals from the associated light receptor elements 5 and 6 can be compared with each other.

The principle of distance determination or range finding wherein the mutually adjoining portions of the target object are projected in different directions according to the pitch between each two adjacent prism bars 3 of the beam spliting element S is disclosed and described in the Japanese Published Patent Specification No. 60645/1973 which was laid open to public inspection on Aug. 25, 1973. In summary, when the image of the target object is exactly focused on the beam spliting element S, the contrast of the image thereof is, at this moment, maximized and, accordingly, the difference or ratio between the level of output from one of the light receptor elements 5 and 6 and that from the other of the light receptor elements 6 and 5 attains a maximum value. On the contrary thereto, when the image of the target object projected onto the beam spliting element S through the lens 1 is out of focus, the contrast of the image on the beam spliting element S is so low that the difference or ratio between the level of output from one of the light receptor elements 5 and 6 and that from the other of the light receptor elements 6 and 5 attains a relatively small value. In view of this, if the lens or the particular image plane is moved relative to the particular image plane or the lens, respectively, in a direction parallel to the optical axis in accordance with the detected difference in the output level between the light receptor elements 5 and 6, automatic focus control can be achieved.

Figure 12:
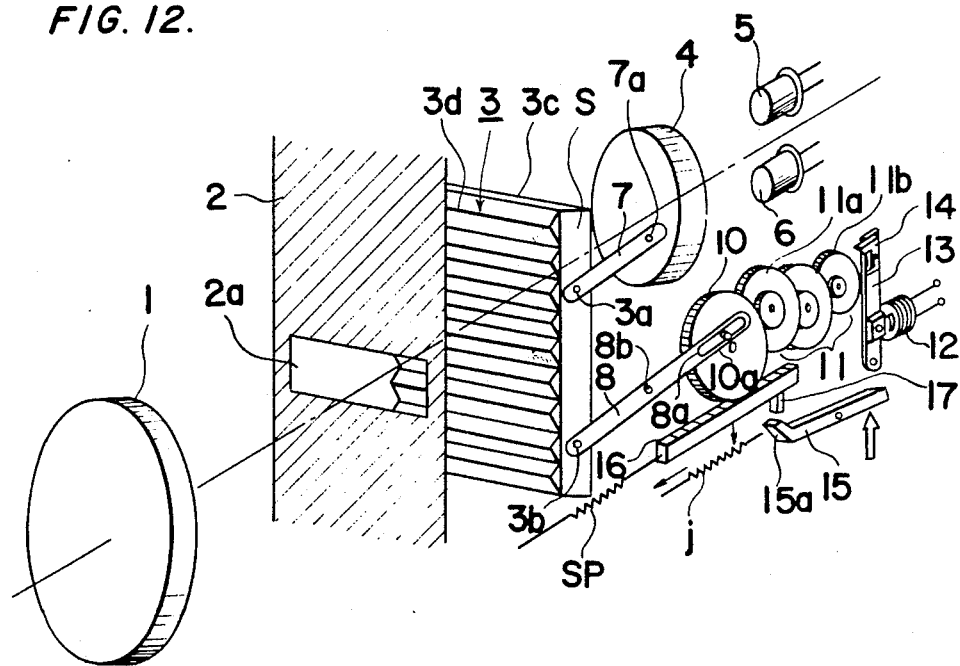
FIG. 12 is a schematic perspective view of a mechanism for moving the beam spliting element employed in the system of FIG. 11.

For effecting the movement of the beam spliting element S in the diagonal direction described above, the mechanism of a construction shown in FIG. 12 is employed.

Referring now to FIG. 12, the beam spliting element S is shown as supported in position by means of a pair of parallel links 7 and 8 which have one end pivotally mounted to the beam spliting element S by means of mounting pins 3a and 3b tapped into said beam spliting element S, respectively. The other end of the link 7, which has a smaller length than that of the link 8, is pivotally connected to a suitable frame (not shown) by means of a mounting pin 7a while the link 8 is pivotally connected at a substantially intermediate portion thereof to the suitable frame by means of a mounting pin 8b. It should be noted that the distance between the pivots 3a and 7a and the distance between the pivots 3b and 8b should be equal to each other while the links 7 and 8 extend in parallel relation to each other.

In the arrangement so far described, it is clear that, when the links 7 and 8 are simultaneously pivoted about the associated pins 7a and 8b in the same direction, the beam spliting element S moves depicting a curved orbit, the center of which is located intermediate between the pins 7a and 8b, with the plane of the beam spliting element S lying on the plane perpendicular to the optical axis. Therefore, it can readily be seen that the beam spliting element can be moved in a direction parallel to the optical axis and, simultaneously therewith, shifted in a direction perpendicular to the optical axis without destroying the parallel relation between the plane of the beam spliting element and the plane perpendicular to the optical axis.

The other end of the link 8, which is remote from the mounting pin 3b, is formed with an elongated slot 8a extending in parallel relation to the lengthwise direction of said link 8. The elongated slot 8a in the link 8 is operatively coupled to a drive wheel 10 having one disc face rigidly mounted with an eccentric pin 10a, which pin 10a loosely extends through the elongated slot 8a.

The drive wheel 10 has a peripheral surface geared and meshed to an elongated rack 16, which rack 16 is supported in position for linear movement between operative and rest positions and is normally biased to the rest position by the action of a spring element, for example, a tension spring SP. The drive wheel 10 and the rack 16 are associated to each other in such a manner that, during movement of the rack 16 from the operative position towards the rest position as pulled by the tension spring SP, the drive wheel 10 is rotated in one direction, for example, clockwise. As the drive wheel 10 is rotated clockwise, the eccentric pin 10a carried by said drive wheel 10 moves around the axis of rotation of said drive wheel 10 thereby causing the link 8 to reciprocally pivot about the pin 8b so that the beam spliting element S can be moved in a direction diagonal to the optical axis in the manner as hereinbefore described.

The drive wheel 10 is operatively associated with a slow governor for regulating the speed of rotation of the drive wheel 10 to a constant speed. The slow governor comprises a train of gears, generally indicated by 11, one 11a of said gears of said train being engaged to the geared peripheral surface of the drive wheel 10 and the last one 11b of said train of said gears 11 being operatively associated with a solenoid unit 12 in such a manner as will now be described.

The solenoid unit 12 is operatively associated with a carrier lever 13 having one end mounted with a pawl member 14, which pawl member 14 acts, when the solenoid unit 12 is energized, as a governor and is, when the solenoid unit 12 is deenergized, engaged to the last gear 11b of the gear train 11 to stop rotation of the last gear 11b and, hence, the drive wheel 10.

In order to temporarily retain the rack 16 at the operative position when the latter has been pulled thereto and also to release said rack 16 in said operative position to cause said rack 16 to move from the operative position towards the rest position by the action of the tension spring SP, an operating mechanism is provided which comprises an pivotable release lever 15, supported for pivotal movement between locked and released positions, and a stop 11 rigidly secured to the rack 16. The release lever 15 has one end formed with an engagement 15a and the other end formed into a handle and is designed such that, when the rack 16 is pulled to the operative position against the tension spring SP, the engagement 15a of said lever 15 engages the stop 17 to retain the rack 16 at said operative position while, when the lever 15 is pivoted to the released position, the engagement 15a, which has been engaged to the stop 17, is disengaged from the stop 17 to thereby permit the rack 16 to move towards the rest position as pulled by the tension spring SP.

In practice, the solenoid unit 12 is operatively associated with the release lever 15 by means of any known electromechanical linkage means such that, when said release lever 15 is pivoted from the locked position to the released position, the solenoid unit 12 can be energized. Therefore, it will readily be understood that, when the release lever 15 is pivoted from the locked position to the released position, the rack 16 commences to move from the operative position towards the rest position while it rotates the drive wheel 10 at a predetermined constant speed regulated by the governor then acted by the pawl member 14.

In the description made with reference to FIG. 11, two condensing lenses 4a and 4b have been referred to. However, in the embodiment shown in FIG. 12, a single condensing lens 4 is employed. Where the single condensing lens 4 is employed such as shown in FIG. 12, the light receptor elements 5 and 6 may be disposed at the focal point of the condensing lens 4 or at a position where the image on the beam spliting element S is projected by the condensing lens 4.

More specifically, the employment of the single condensing lens 4 in place of the two separate condensing lenses 4a and 4b is possible because the rays of light passing through the beam spliting element are dispersed in two directions diverging from the optical axis of the lens 1 depending upon whether they have entered the prism face 3c of each of the prism bars 3 or whether they have entered the prism face 3d of each of the prism bars 3. Hence, the single condensing lens 4 is so sized that it can pass both a component of the light rays travelling in one direction diverging from the optical axis and a component of the light rays travelling in the other direction diverging from the optical axis.

Where the light receptor elements are to be disposed on the focal point of the condensing lens 4, only a particular bundle of rays of light, which is a part of the light component passing through the prism faces and emerging from the beam spliting element at a particular angle, can be collected onto the light receptor elements. Accordingly, by suitably selecting the optical axis of the light receptor elements and the position thereof in the vertical direction, only the light component emerging from the beam spliting element at the particular angle relative to the optical axis can be detected. In other words, the beams of light which have respectively been transmitted through the prism faces 3c and 3d exhibit different distribution of angles of refraction and a beam of light travelling within a certain range of angle relative to the optical axis is the one which has been transmitted through either of the prism faces 3c and 3d of each of the prism bars 3.

The operation of the mechanism shown in FIG. 12 will now be described.

Assuming that the rack 16 is pulled to the operative position against the tension spring SP and locked in position by the engagement between the engagement 15a and the stop 17, pivotal movement of the release lever 15 from the locked position towards the released position, which is effected by the application of an external pushing force to the handle of the lever 15 in a direction as indicated by the arrow, causes the engagement 15a to disengage from the stop 17. Upon disengagement of the engagement 15a from the stop 17, the rack 16 commences to move from the operative position to the rest position as pulled by the tension spring SP. Since the solenoid unit 12 is, at this time, energized, the movement of the rack 16 thus effected results in rotation of the drive wheel 10 while the pawl member 11 is brought into position to act as the governor relative to the gear train 11. Accordingly, the drive wheel 10 is rotated at the predetermined constant speed and, consequently, the beam spliting element S is forwardly and upwardly moved without destroying the parallel relation between the plane of said element S and the plane perpendicular to the optical axis. In other words, the beam spliting element S is moved in the diagonal direction relative to the optical axis and, during each rotation of the drive wheel 10, said beam spliting element is reciprocated in the diagonal direction.

During each reciprocal movement of the beam spliting element in the diagonal direction described above. The image projected onto the beam spliting element through the range-finding lens 1 by means of the mask aperture 2a can reciprocally be scanned in the direction perpendicular to the optical axis.

When the image projected onto the beam spliting element S is exactly focused thereon after the movement of the beam spliting element has been commenced, the difference between the level of output from the light receptor element 5 and that from the light receptor element 6 attains a maximum value and the comparison circuit (not shown) gives an output signal to a control circuit for the solenoid unit 12 whereby the latter can be deenergized to cause the pawl member 14 to stop rotation of the gear train 11 and, hence, the drive wheel 10.

At the time the image has been focused on the beam split element S during the movement of said element S in the diagonal direction, it is necessary to obtain an electric signal indicative of the position of the beam spliting element S in order that, with this electrical signal, an objective lens assembly of, for example, a photographic camera can be automatically manipulated to render the focal point of said objective lens assembly to be aligned with the particular image plane where, for example, a light sensitive film is placed. For this purpose, the movement of the rack 16 is associated with a movable tap of a variable resistor or a potentiometer, which will be described later in more details with reference to FIG. 16.

Figure 13:
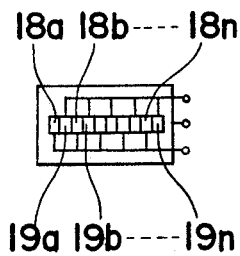
Figure 13:
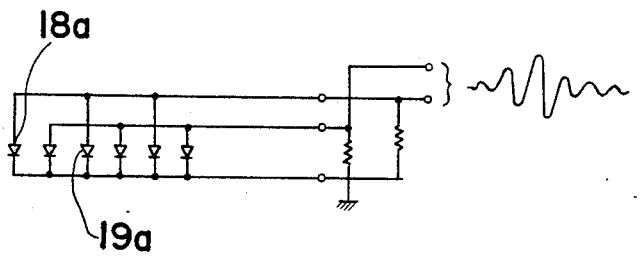

In the foregoing embodiment, the scanner means has been described as employed in the form of the beam spliting element S. However, as shown in FIGS. 13a and b, the scanner means may comprise an array of light receptor elements 18a to 18n and 19a to 19n arranged in a row and formed on a substrate 22, said light receptor elements being electrically connected alternately in parallel to each other substantially as shown in FIG. 13b. Where the array of the light receptor elements shown in FIGS. 13 a and b is to be employed, since the array detects the contrast of the image projected thereon and gives an output signal indicative of the contrast, the light receptor element 5 and 6 and the condensing lens or lenses 4 or 4a and 4b, which have been required in the foregoing embodiment, are not necessary.

Figure 14:
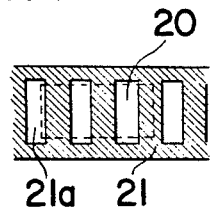
FIG. 14 illustrates a light intercepting element useable in the present invention in place of the beam spliting element.

Alternatively, the scanner means may comprise, as shown in FIG. 14, a slitted belt 21 having a plurality of equally spaced slits 21a. Where the slitted belt 21 is to be employed, a light receptor element 20, which is employed in place of the light receptor elements 5 and 6 in the foregoing embodiment, must have a light receiving area sufficient to cover one or more slits 21a of the slitted band 20.

Figure 15:
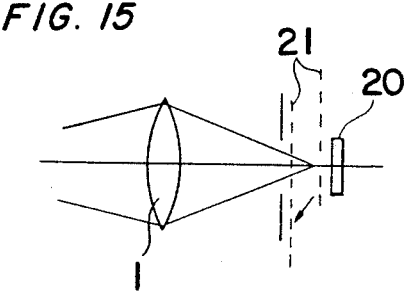
FIG. 15 illustrates the position of the light intercepting element in the optical system of the focus control device according to the present invention.

As best shown in FIG. 15, even the slitted band 21 has to be moved in the diagonal direction with respect to the optical axis of the lens 1 in an identical manner as the beam spliting element S. This is partly because the movement of the slitted band 21 in the direction parallel to the optical axis is necessary to detect the distance between the object and the lens 1 and partly because the movement of said slitted belt 21 in the direction perpendicular to the optical axis of necessary to detect the contrast of the image of the object.

In operation, when the image of the object projected through the lens 1 is exactly focused on the slitted belt 21, the contrast of the image thus focused on the slitted belt 21 is maximized and, therefore, an output signal from the light receptor element 20 is greatly varied by the movement of the slitted belt 21 in the direction perpendicular to the optical axis. On the other hand, when the image of the object projected on the slitted belt is out of focus, no great variation occur in the output signal from the light receptor element 20.

Figure 16:
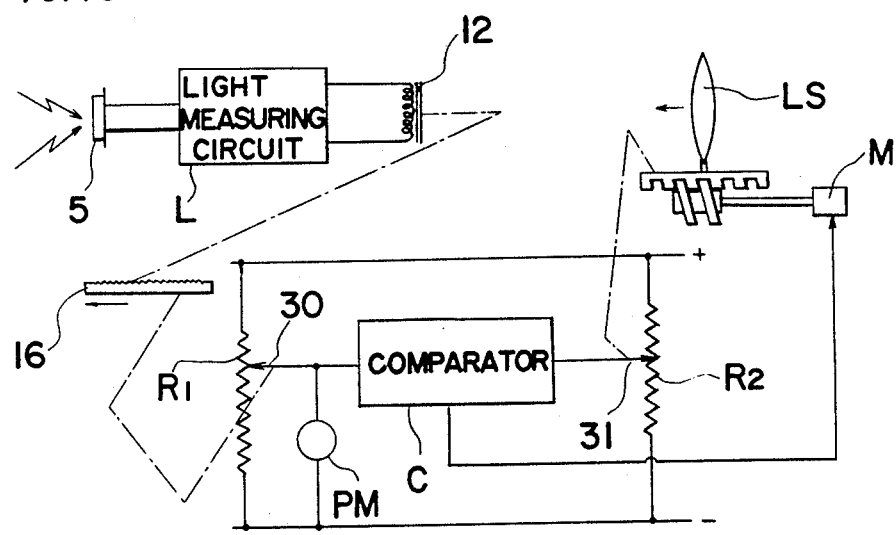
FIG. 16 is a schematic block diagram of the focus control device according to one embodiment of the present invention.

Referring now to FIG. 16, the variable resistor having the movable tap adjustable by the movement of the rack 16 is indicated by $R_1$. The movable tap 30 of the resistor $R_1$ is, while mechanically coupled to the rack 16, electrically coupled to a comparison circuit C so that an electrical signal of a value determined by the reading of the movable tap 30, which is indicative of the position of the rack 16, can be applied to said comparison circuit C.

A light measuring circuit L is adapted to receive the output signal from the light receptor 5 and to generate an output signal when the amplitude of the output signal from the light receptor 5 attains a maximum value, which output signal from said circuit L being used to deenergize the solenoid unit 12.

In the case where the device according to the present invention is used to measure the distance between the target object and the range-finding lens 1, the measured value of such object-to-lens distance can be, at the time the image of the object is exactly focused, displayed by a meter DM. On the other hand, in the case where the device according to the present invention is used to effect the focus control with respect to an objective lens assembly of, for example, a photographic camera to focus the image of the object on the particular image plane, an output signal from the comparision circuit C is adapted to be applied to a motor M to control the operation of said motor M. The motor M is mechanically linked to the objective lens assembly LS by means of, for example, a pinion and rack arrangement or any other suitable motion translator, so that rotation of the motor M causes the lens assembly LS to move in a direction parallel to the optical axis of said lens assembly LS in pursuit of the true focus setting.

The axial displacement of the objective lens assembly LS causes a movable tap 31 of a variable resistor $R_2$ to apply an electric signal indicative of the reading of the resistance of the resistor $R_2$ to the comparision circuit C so that, when the level of the signal from the tap 30 and that from the tap 31 coincide with each other, the comparision circuit C ceases to generate the output signal which has been applied to the motor M to rotate the latter. Consequently, at the time the comparision circuit C ceases to generate the output signal, the objective lens assembly LS can be held in position with the image of the target object exactly focused on the particular image plane.

Figure 17:
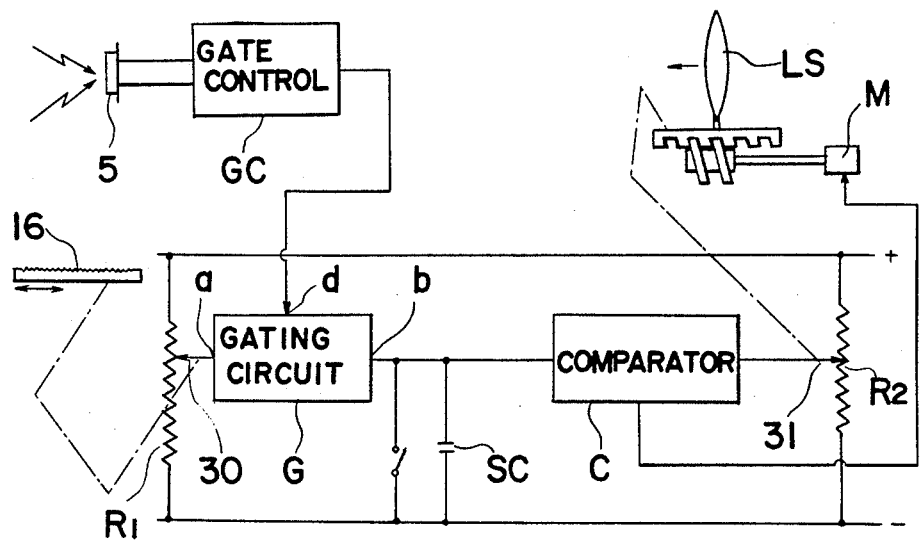
FIG. 17 is a schematic block diagram of the focus control device according to another embodiment of the present invention.

In FIG. 17, there is shown an electric circuit for the automatic focus control system wherein the rack 16 and, accordingly, the movable tap 30 of the variable resistor $R_1$, need not be stopped. For this purpose, a gating circuit G having an input terminal a, electrically coupled to the movable tap 30, and an output terminal b electrically coupled to the comparision circuit C is employed, which gating circuit G is capable of generating an output signal, which corresponds to the reading of the movable tap 30 applied to the input terminal a of the gating circuit G, through the output terminal b only when a pulse is applied to another input terminal d from a gate control GC. The voltage represented by the output signal from the terminal b of the gating circuit G is charged on a storing capacitor SC.

The gate control GC is designed such as to detect peak values of the output signal of pulsating character which has been applied from the light receptor 5 and to generate the pulse to the gating circuit G only when the highest value of the peak values of the output signal has been detected thereby. As hereinbefore described, the pulse from the gate control circuit GC used to operate the gating circuit G so that the signal indicative of the reading of the movable tap 30, which is applied to the terminal a can be passed to the terminal b and in turn to the storing capacitor SC.

As hereinbefore described, each time the gating circuit G receives pulses from the gate control circuit GC voltage proportional to the reading of the movable tap 30 of the variable resistor $R_1$ is fed through the gate control circuit G and subsequently stored on the capacitor SC. The charge on the capacitor SC varies each time the pulse is applied from the gate control circuit GC to the gating circuit G and an electric signal indicative of the charge on the capacitor SC is applied to the comparision circuit C. The comparision circuit C operates in a similar manner as that employed in the embodiment of FIG. 16.

From the foregoing description, it has now become clear that measurement of the object-to-lens distance and detection of the contrast of the image of the object can be achieved simultaneously only by moving the scanner means in one direction, that is, in the diagonal direction with respect to the optical axis. Therefore, no complicated mechanism, which has heretofore been necessitated, is required.

Although the present invention has been fully described by way of the preferred embodiments thereof, it should be noted that various changes and modifications are apparent to those skilled in the art. Therefore, such changes and modification should be understood as included within the true scope of the present invention unless they depart therefrom.

What is claimed is:

1. An automatic focus control device which comprises:
    lens means for focusing an image of a target object;
    scanning means functioning as a spatial frequency filter and substantially disposed on the optical axis of said lens means for movement in a direction diagonal to said optical axis close to and away from said lens means, said image of said target object being adapted to be focused on said scanner means during movement of said scanner means;
    means for reciprocally moving said scanner means in said diagonal direction close to and away from said lens means with the plane of said scanner means maintaining a parallel relation to the plane perpendicular to said optical axis;
    first means for detecting the amplitude of spatial frequency of said image of said target object projected onto said scanner means through said lens means;
    second means electrically connected with said first detecting means for detecting a maximum value of said amplitude of said spatial frequency, said maximum value when detected indicating that the image of said target object has exactly been focused.

2. An automatic focus control device as claimed in claim 1, further comprising means for reading out a component of the movement of said scanner means in a direction parallel to the optical axis, when said maximum value is detected.

3. An automatic focus control device as claimed in claim 2, wherein said reading means comprises a display unit for visually presenting information concerning the distance between the target object and said lens means.

4. An automatic focus control device as claimed in claim 2, wherein said reading means is operatively associated with an objective lens assembly of a photographic camera, said objective lens assembly being movable in a direction parallel to the optical axis of said objective lens assembly in pursuit of a true focus setting.

5. An automatic focus control device as claimed in claim 4, wherein movement of said objective lens assembly in pursuit of the true focus setting is stopped in accordance with a result read by said reading means.

6. An automatic focus control device as claimed in claim 1, wherein the movement of said scanner means is stopped when said second detecting means detects said maximum value.

7. An automatic focus control device as claimed in claim 1, further comprising a masking member having an aperture formed therein, said masking member being disposed between said lens means and said scanner means with said aperture aligned with said optical axis of said lens means.

8. An automatic focus control device as claimed in claim 1, wherein said scanner means and said first detecting means are the same.

9. An automatic focus control device as claimed in claim 6, wherein said stoppage of said movement of said scanner means is effected by means of a solenoid unit operable by an output signal from said second detecting means.

10. An automatic focus control device as claimed in claim 2, wherein said reading means includes a variable resistor having a movable tap, said movable tap being operatively coupled to said reciprocally moving means.

11. An automatic focus control device as claimed in claim 1, wherein said first detecting means comprises a pair of light receptor elements.

12. An automatic focus control device as claimed in claim 1, wherein said scanner means comprises a beam spliting element.

13. An automatic focus control device as claimed in claim 1, wherein said scanner means comprises a slitted belt.

* * * * *